United States Patent [19]

Ozaki et al.

[11] 3,911,180
[45] Oct. 7, 1975

[54] METHOD OF MAKING A RESIN COATED PAPER HAVING A SMOOTH SURFACE

[75] Inventors: Tomoaki Ozaki; Nobuhiko Minagawa, both of Fujimiya; Kazunobu Kato, Minami-ashigara, all of Japan

[73] Assignee: Fuji Photo Film Co., Ltd., Minami-ashigara, Japan

[22] Filed: Oct. 13, 1972

[21] Appl. No.: 297,558

[30] Foreign Application Priority Data
Oct. 15, 1971  Japan.............................. 46-81377

[52] U.S. Cl. ................ 427/362; 264/171; 427/366
[51] Int. Cl.² ........................................... B44D 1/44
[58] Field of Search............ 117/64 C, 65.2, 111 H, 117/155 UA, 155 R, 157; 118/60, 202; 264/284, 293, 331, 171

[56] References Cited
UNITED STATES PATENTS

| | | | |
|---|---|---|---|
| 2,919,205 | 12/1959 | Hart................................ | 117/64 C |
| 3,028,258 | 4/1962 | Rice................................ | 117/64 C |
| 3,078,178 | 2/1963 | Ostberg............................ | 117/64 X |
| 3,110,612 | 11/1963 | Gottwald et al. ................. | 117/64 C |
| 3,296,014 | 1/1967 | Williams ......................... | 117/64 C |
| 3,300,364 | 1/1967 | Gottwald et al. ................. | 117/64 X |
| 3,330,688 | 7/1967 | Halsey et al. .................... | 117/64 C |
| 3,442,685 | 5/1969 | Lohnas et al. .................... | 118/60 X |
| 3,575,707 | 4/1971 | Ploetz et al. ..................... | 117/64 C |

*Primary Examiner*—Michael R. Lusignan
*Attorney, Agent, or Firm*—Sughrue, Rothwell, Mion, Zinn, & Macpeak

[57] ABSTRACT

A method of making resin coated paper having a surface of good smoothness which comprises forming a thermoplastic resin layer on the paper and pressing the thus resin coated paper between two or more rolls including a metal roll which contacts the resin coated surface, in which the surface temperature of the rolls is kept at 30°C – 150°C and the pressure between the rolls is kept at 50kg/cm – 350kg/cm.

4 Claims, 10 Drawing Figures

METHOD OF MAKING A RESIN COATED PAPER HAVING A SMOOTH SURFACE

BACKGROUND OF THE INVENTION

1. FIELD OF THE INVENTION

The present invention relates to a method of making resin coated paper having a smooth surface.

2. DESCRIPTION OF THE PRIOR ART

Various methods of making resin coated paper are known, for example:

1. an extrusion coating method which comprises coating the surface of a paper with a molten resin such as polyethylene or polypropylene
2. a lamination method which comprises laminating a resin film such as a polyester, polyamide or cellulose ester onto a surface of the paper using an adhesive, and
3. a solution coating method which comprises applying a resinous solution such as that obtained by dissolving a resin such as a cellulose ester in a solvent onto a surface of the paper and drying.

In no case has a satisfactorily smooth surface been obtained by such processes. In addition, any uneven texture of the paper is pronounced on the resin coated surface in the case of the extrusion coating method, the lamination method or the solution coating method and coating streaks and uneveness due to application are encountered on the resin coated surface in the case of the solution coating method.

Hitherto, in the case of the extrusion coating method and the lamination method, a treatment for smoothing the surface of the base paper has been carried out in order to obtain a smooth surface. However, a completely smooth surface cannot be obtained on the resin coated paper because there is a limit that the surface of the base paper can be smoothed.

It has further been known that the smoothness of the resin coated surface can be improved by increasing the thickness of the coated resin layer. However, the cost becomes increased and sometimes increased curling is encountered.

In the case of the solution coating method, it is impossible to obtain a smoothness superior to that of a resin coated surface obtained by the extrusion coating method or the lamination method even though uneveness due to resin application is removed completely.

SUMMARY OF THE INVENTION

As a result of many studies regarding smoothing the surface of a resin coated paper, the present inventors reached their objective of providing a superior resin coated paper by providing a process which comprises a making a resin coated paper having a smooth surface by pressing the resin coated paper between two or more rolls including a metal roll which contacts the resin coated surface at a roll surface temperature of 30°C – 150°C and at a pressure between the rolls of 50kg/cm – 350kg/cm.

BRIEF DESCRIPTION OF THE DRAWINGS

Figure 1:
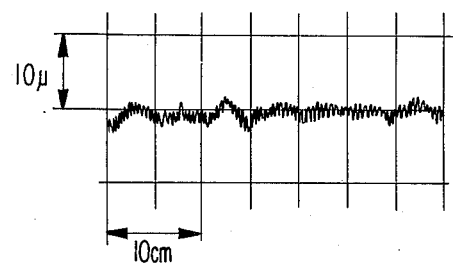

Brief explanation of drawing:

FIGS. 1 to 10 are graphs obtained by continuously measuring the smoothness of the surfaces of resin coated papers.

DETAILED DESCRIPTION OF THE INVENTION

In the following material the present invention will be explained in more detail.

As the paper used in the present invention, any paper that has been used as the base paper for resin coated papers may be used, for example, kraft paper, high-grade printing paper and glazing paper, etc.

As the coating resin, polyethylenes, polypropylenes, cellulose esters, polyamides and linear polyesters are preferably used, however, it will be easily understood that other film forming thermoplastic resins can be used successfully.

As described above, the present invention is characterized by a process step wherein a resin coated paper having a surface of good smoothness is obtained by pressing the resin coating between two or more heated rolls after carrying out coating with the resin by the extrusion, resin solution or lamination method, pressure application being within certain pressure temperature bounds.

Although it is desirable all of the rolls for pressing are made from metal, rolls which do not contact the coated surface need not always be made of a metal.

The metal rolls used have a surface temperature in the range of 30°– 150°C and the pressure exerted on the resin coated paper therebetween is in the range of 50kg/cm–350kg/cm over the width of the roll. If the above mentioned temperature and pressure conditions are not simultaneously satisfied during processing, a smooth resin coated surface cannot be obtained. When either the temperature or the pressure is below the above-mentioned range, the state of the resin coated surface is the same as that of a resin coated paper not processed in accordance with the present invention, that is, the effect of the pressing treatment does not appear. On the other hand, when either the temperature or the pressure is above the above mentioned range, deformation of the resin coated surface results due to heat or stress. For example, a lowering of gloss and local changes in the thickness of the resin layer are caused.

In order to obtain the smoothest surface, an optimum combination of temperature and pressure is empirically determined corresponding to the thickness of the resin coated paper and the type of coating resins. This can easily be done with only a few process runs. For instance, in general, it is necessary to increase the pressure between the rolls as the thickness of the resin coated paper increases. In the case of using a low density material, such as polyethylene having a low density, as the coating resin, a combination of a comparatively low temperature and a comparatively low pressure within the above mentioned ranges is preferred. On the other hand, in the case of using a high density material, such as polyethylene having a high density or polypropylene, a combination of a low temperature and a high pressure is preferred. Further, in the case of the resin coated paper in which resins having a high glass transition temperature, such as cellulose esters, polyamides and linear polyesters, are used, a combination of a high temperature and a high pressure is preferred. The details of the use of the metal roll are described in the following examples.

It should be noted that when smoothness of the surface of a resin coated paper is measured continuously by means of an electron micrometer (such as is produced by Adachi Electric Co.) the roughness of the coated surface can be largely decreased and a surface of good smoothness can be obtained by the present invention.

EXAMPLE 1

One surface of a high grade printing paper having a 100g/m² weight was coated with low density polyethylene, i. e., specific gravity 0.926, melt index 2, by extruding the polyethylene at 300°C to form a resin film having a 40μ thickness. In this case, the surface of the resin layer was cooled by casting onto a mirror roll.

The resulting resin coated paper was pressed with a calendering machine (produced by YURIROLL Co., Type TS-0304, set of 3 metal rolls). The surface temperature of the metal rolls was 50°C and the pressure between the metal rolls was 80kg./cm.

Figure 2:
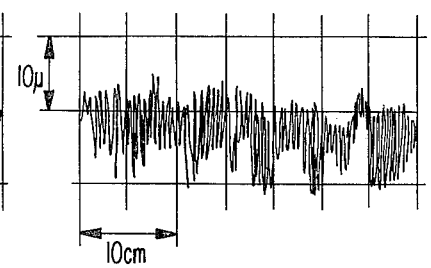

The results of measuring the smoothness of the surface of the calendered resin coated paper are shown in FIG. 1. The results from measuring a resin coated paper produced in the same manner but which had not been calendered are shown in FIG. 2. These results show a significant increase in surface smoothness by calendering.

EXAMPLE 2

One surface of a kraft paper (150g/m² in weight) was coated with polyprolylene by extrusion at 320°C to form a resin layer having a 35μ thickness. The surface of the resin layer was cooled by casting onto a metal mirror surface roll to further smoothen the surface.

Figure 3:
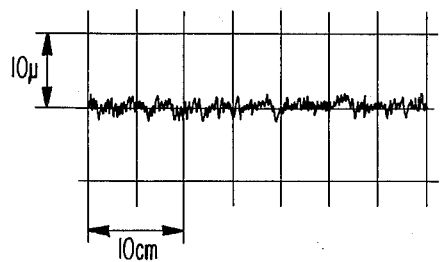
Figure 4:
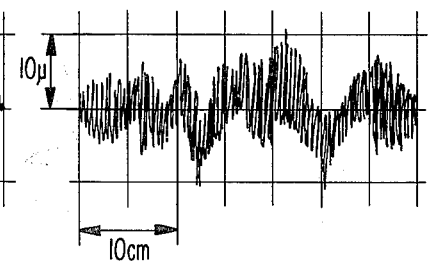

The resulting resin coated paper was pressed by means of the calender described in Example 1. In this case, the surface temperature of the metal rolls was 80°C and the pressure between the metal rolls was 20kg/cm. The results of measuring the smoothness of the surface of the calendered resin coated paper are shown in FIG. 3, with the results for an otherwise identical resin coated paper which had not been calendered being shown in FIG. 4. It is clear from these results that the surface was substantially smoothened by calendering. EXAMPLE 3

A resinous solution having the following composition was applied onto a surface of a high grade printing paper (130 g/m² in weight).

| Cellulose triacetate | 1 part by weight |
|---|---|
| Methyl alcohol | 4 parts by weight |
| Methylene chloride | 16 parts by weight |

The thickness of the resin film layer was 15 μ. After drying, the resin coated paper was pressed by means of a calender (produced by YURIROLL Co., Type TSC-301) having a set of 3 rolls, a combination of metal rolls and a cotton roll.

Figure 5:
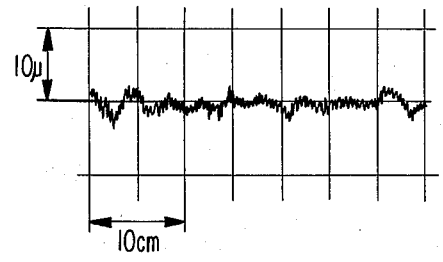
Figure 6:
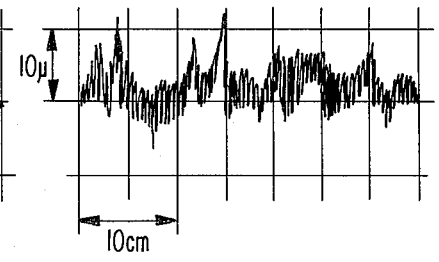

In this case, the resin coated paper was treated so as to contact the coated surface with a metal roll. The surface temperature of the metal rolls was kept at 150°C and the pressure between the rolls was 350kg/cm. The results of measuring the smoothness of the surface of the calendered resin coated paper are shown in FIG. 5, and the results for an identical resin coated paper which had not been calendered are shown in FIG. 6. It is clear from the these results that the surface of the resin coated paper was significantly smoother due to calendering.

EXAMPLE 4

A resinous solution having the following composition was applied onto one surface of a glazing paper (80g/m² in weight).

| Polyvinyl acetate | 1 part by weight |
|---|---|
| Acetone | 9 parts by weight |

The thickness of the resin layer was 30μ.

This resin coated paper was pressed by means of the calender described in Example 1.

In this case the surface temperature of the metal rolls was 30°C and the pressure between the metal rolls was 50kg/cm.

Figure 7:
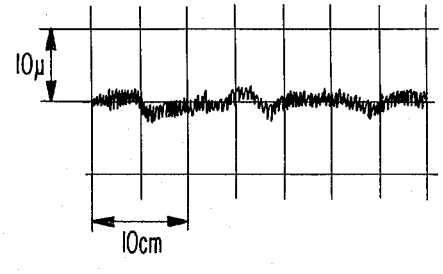
Figure 8:
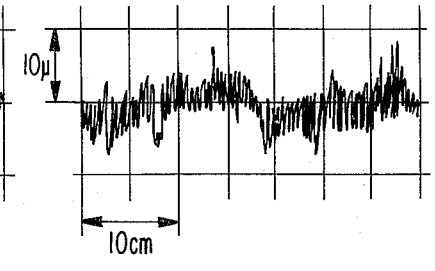

The results of measuring the smoothness of the surface of the calendered resin coated paper are shown in FIG. 7, and those for an identical resin coated paper which had not been calendered are shown in FIG. 8. It is clear from these results that the surface became smooth by calendering.

EXAMPLE 5

After applying an acrylic adhesive (NIKASOL FL-3000 produced by Nippon Carbide Co.) onto a surface of a high grade printing paper (100g/m² in weight) in an amount of 10g/m², a nylon sheet 50μ thick was laminated onto the paper.

Figure 9:
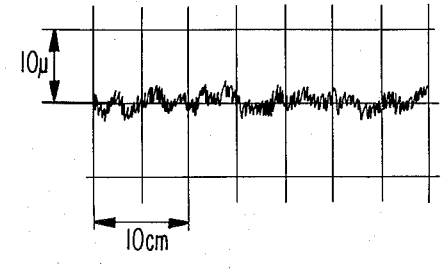
Figure 10:
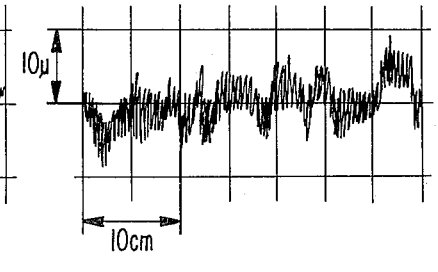

The resulting resin coated paper was pressed by means of the calender described in Example 1. In this case, the surface temperature of the metal rolls was 100°C and the pressure between the metal rolls was 200kg/cm. The results of measuring the smoothness of the surface of the calendered resin coated paper are shown in FIG. 9, with those for an otherwise identical paper not calendered being shown in FIG. 10. It is clear from these results that the surface became smooth by calendering.

While the invention has been described in detail and with reference to specific embodiments thereof, it will be apparent to one skilled in the art that various changes and modifications can be made therein without departing from the spirit and scope thereof.

What is claimed is:

1. A method of making resin coated paper having a surface of good smoothness which comprises forming a thermoplastic resin layer on the paper and pressing the thus resin coated paper between two or more heated metal rolls, in which the surface temperature of the rolls is kept at 30°C–150°C and the pressure between the rolls is kept at 50 kg/cm-350 kg/cm.

2. The method of claim 1, wherein the step of forming said thermoplastic resin layer comprises coating by resin solution followed by drying prior to said pressing.

3. The method of claim 1, wherein said step of forming a thermoplastic resin layer comprises coating by extrusion followed by curing prior to said pressing.

4. The method of claim 1 wherein the thermoplastic resin layer comprises a member selected from the group consisting of polyethylene, polypropylene, cellulose esters, polyamides and linear polyesters.

* * * * *